Figure 1:
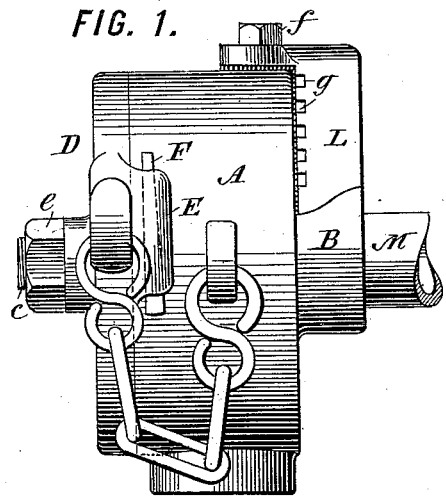

(No Model.) 3 Sheets—Sheet 1.

E. E. GOLD.
THERMOSTATIC STEAM TRAP.

No. 507,268. Patented Oct. 24, 1893.

WITNESSES:
Fred White
C. K. Fraser.

INVENTOR:
Edward E. Gold,
By his Attorneys,
Arthur C. Fraser & Co.

(No Model.) 3 Sheets—Sheet 2.

E. E. GOLD.
THERMOSTATIC STEAM TRAP.

No. 507,268. Patented Oct. 24, 1893.

WITNESSES:
Fred White
C. K. Fraser.

INVENTOR:
Edward E. Gold,
By his Attorneys,
Arthur E. Fraser & Co.

(No Model.)   E. E. GOLD.   3 Sheets—Sheet 3.
THERMOSTATIC STEAM TRAP.

No. 507,268. Patented Oct. 24, 1893.

WITNESSES:
Fred White
C. K. Fraser

INVENTOR:
Edward E. Gold,
By his Attorneys,
Arthur E. Fraser & Co.

UNITED STATES PATENT OFFICE.

EDWARD E. GOLD, OF NEW YORK, N. Y.

THERMOSTATIC STEAM-TRAP.

SPECIFICATION forming part of Letters Patent No. 507,268, dated October 24, 1893.

Application filed March 31, 1893. Serial No. 468,504. (No model.)

*To all whom it may concern:*

Be it known that I, EDWARD E. GOLD, a citizen of the United States, residing in the city, county, and State of New York, have invented certain new and useful Improvements in Thermostatic Steam-Traps, of which the following is a specification.

This invention relates to traps for the automatic discharge of condensed water from steam mains, pipes or vessels. It pertains to that class of thermostatic steam traps wherein the valve is, or is actuated by, a closed vessel of elastic metal containing liquid which volatilizes at a temperature below that of the steam, and wherein such vessel is inclosed within a casing with which the steam-pipe to be drained communicates on one side of the valve, and an outlet pipe or opening for discharging the water is provided on the other side of the valve. A trap of this type, and upon which my present invention is most immediately an improvement, is shown in my Patent No. 424,779, dated April 1, 1890.

In thermostatic traps of this character the valve remains closed by the expansion of the elastic vessel containing the volatile liquid so long as that liquid is heated above a certain degree, so that as long as the steam-pipe or vessel connecting with the trap contains steam or hot water of condensation, the trap remains closed. But when the condensation water has cooled to a certain temperature, and when consequently the volatile liquid in the elastic vessel has likewise cooled to the requisite extent, this vessel contracts and thereby opens the valve and permits the accumulated water to flow out until hot water or steam begins to pass the trap, whereupon by the re-heating of the volatile liquid the vessel is again expanded to close the trap. The trap consequently operates at intervals to discharge the water of condensation which continually accumulates in the steam-pipe or vessel, the frequency of operation of the trap depending upon the rapidity with which its thermo-expansion vessel is cooled after each re-heating by which it is expanded to close the valve.

The object of my present invention is to render the operation of the trap more rapid in order that the water of condensation shall be drained off at more frequent intervals, thereby avoiding the accumulation of so large a body of condensed water as has heretofore occurred. To this end I so construct the shell or casing of the trap within which the elastic or thermo-expansion vessel is inclosed as to cause a current of air to continuously flow through the casing in contact with the thermo-expansion vessel, in order that after being heated to close the trap it shall be cooled more rapidly than heretofore in order to accelerate the reopening of the trap and consequent discharge of the accumulated water. The casing of the trap is accordingly provided with air inlet and outlet openings at opposite sides of the vessel, preferably above and below, to facilitate the admission and discharge of air flowing past the thermo-expansion vessel. A shield or deflector is provided for preventing any dangerous outflow of hot water or steam through the air openings.

Figure 2:
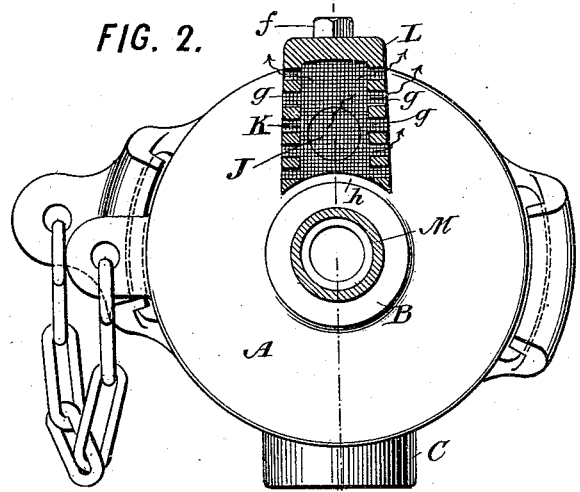
Figure 3:
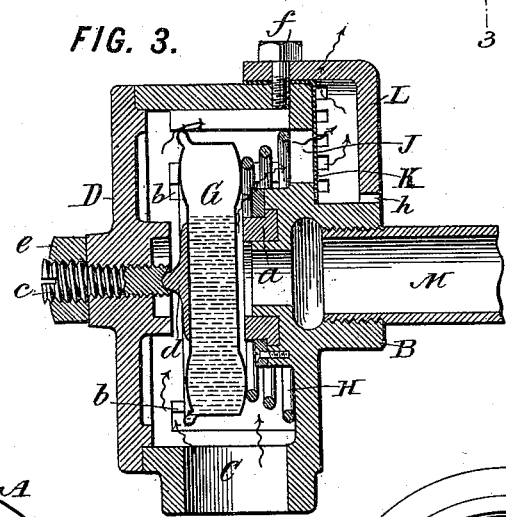
Figure 4:
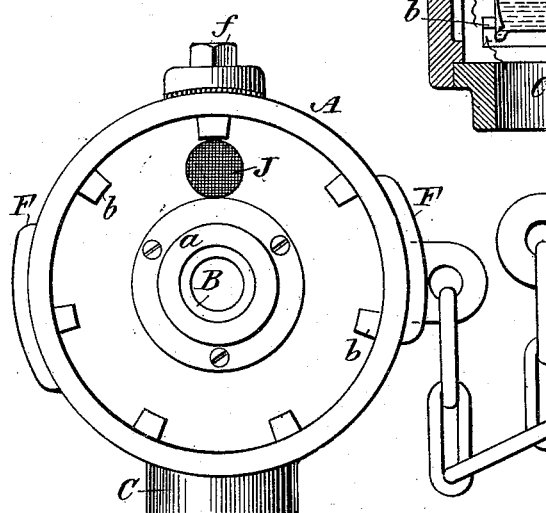
Figure 5:
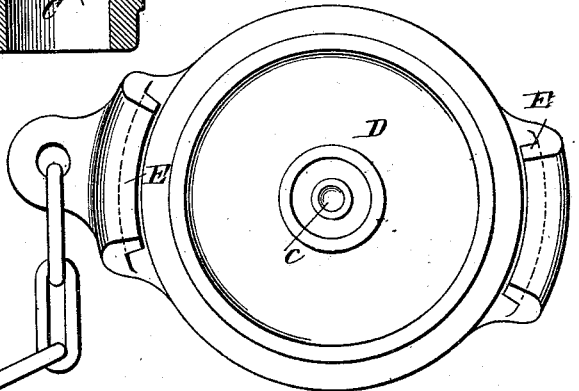
Figure 8:
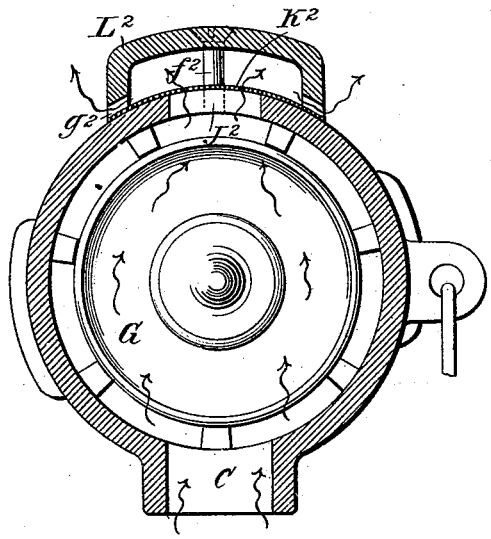
Figure 6:
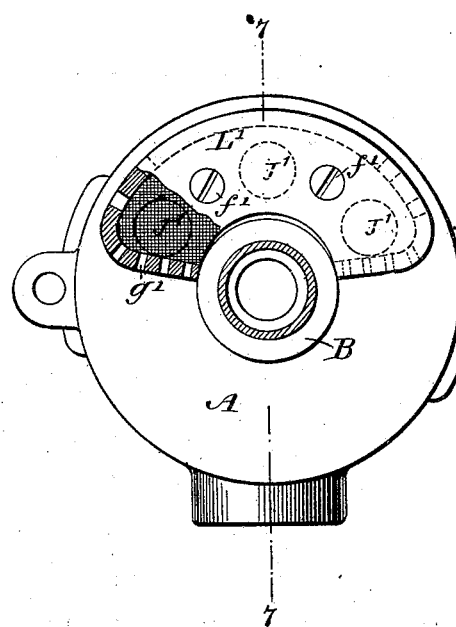
Figure 7:
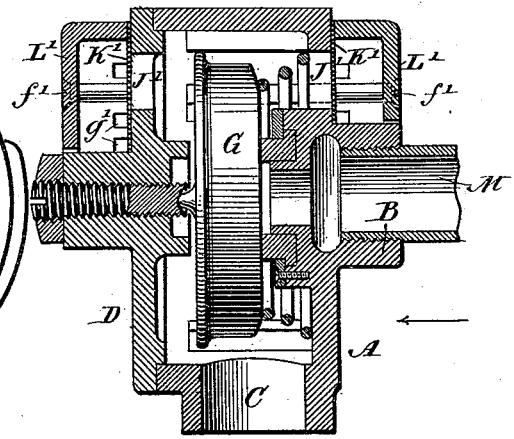
Figure 9:
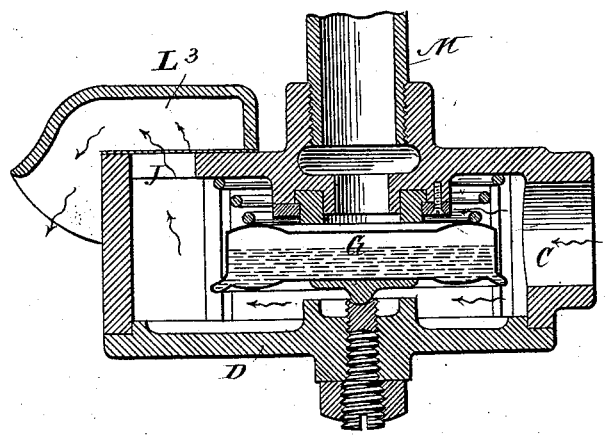

Figure 1 of the accompanying drawings is a side elevation of the preferred construction of my improved steam trap. Fig. 2 is a rear elevation thereof partly in vertical section. Fig. 3 is a vertical section through the center of the trap on the line 3—3 in Fig. 2. Figs. 4 and 5 are elevations of the interior of the trap and inner side of its cover, the latter being removed. Fig. 6 is an elevation answering to Fig. 2 and showing a modified construction. Fig. 7 is a vertical mid-section of the construction shown in Fig. 6. Fig. 8 is an elevation answering to Fig. 4, but partly in vertical section and showing a further modification. The foregoing views illustrate my invention as applied in three different ways to the construction of trap shown in my said Patent No. 424,779. Fig. 9 is a vertical section illustrating the application of my invention to a differently arranged thermostatic trap.

Referring first to Figs. 1 to 8, let A designate the casing of the steam trap, which is preferably formed of cast metal in cylindrical shape, and having a threaded hub B for connection with a pipe or vessel from which the water of condensation is to be drained, and having also a discharge opening C at the lower side through which the condensed water may escape from the trap.

D is the cover of the trap casing, which is united to the fixed part thereof by being cast with diametrically opposite hooks E E adapted to engage with lugs or wings F F which are cast upon the casing A and have inclined inner faces. Or the cover may be fastened to the casing A in any other suitable manner.

Within the casing A is placed a thermo-expansion vessel G, which is a closed vessel of elastic metal partly filled with some liquid which volatilizes at a temperature below that of steam, and sealed. The front face of the vessel G is made nearly flat in order that it may seat against a valve seat $a$, which is formed within the inlet opening B, and which is preferably a ring of suitable elastic composition. The vessel G is loosely inclosed within the casing, the latter being formed with ribs $b\ b$ to hold the vessel in place. To adjust it toward or from the valve seat, an adjusting screw $c$ is provided which engages the plate $d$ on the back of the vessel. The screw $c$ is provided with a set-nut $e$. A coiled spring H is placed within the casing in order to press the vessel G away from the valve seat $a$ and to cause it to open when cool against any slight vacuum that may exist in the steam pipe. So far as described the construction is the same as that already disclosed in my said Patent No. 424,779. I will now proceed to describe the improvements introduced by my present invention.

As applied to the construction of trap just described my invention is very simple.

Referring to the construction shown in Figs. 1 to 5, the trap casing is unchanged except that an air outlet opening J is made through its front wall near the top, that is, between the hub B and the roof of the casing. Over this opening is placed a sheet K of some foraminous material, preferably wire gauze, the meshes of which are sufficiently open to not materially obstruct the passage of a current of air. On the casing is fastened by a screw $f$ or otherwise, a shield L which covers the opening J and serves to hold the foraminous sheet or strainer K in place over it. This shield L is formed with notches at its edges constituting air holes or openings $g\ g$, while at its bottom it stands clear of the hub B in order to form a space or opening $h$.

Whenever the trap has been heated by escaping steam or hot water and has consequently been closed by the expansion of the vessel G, which acts as a valve and seats against the seat $a$, the heated walls of the casing and of the vessel G serve to heat the air within the chamber of the casing and impart to it consequently a tendency to rise. The heated air ascends within the casing and passes out through the opening J into the space within the shield L, and thence escapes through the holes $g\ g$. The place of the heated air is immediately taken by cold air ascending through the bottom discharge opening C, as shown by the arrows in Fig. 3, which becoming heated in turn passes out through the openings J and $g\ g$ as before. Thus a continuous current of air is maintained through the casing and past the surfaces of the thermo-expansion vessel G, all parts of which are exposed to the air with the exception of the face in contact with and circumscribed by the seat $a$. The other or exposed portions of the vessel consequently give out heat to the current of air, while the portion inclosed within the seat remains in contact with the steam or hot water within a pipe or vessel M, and remains heated thereby so long as the steam or hot water remains thus against it. But upon the cooling of the water, the vessel G being no longer kept heated thereby against the cooling effect of the current of air, quickly cools and contracts, thereby opening the valve and causing the accumulated and cold or cool condensed water to flow out. By reason of the cooling effect of the current of air passing through the trap casing, the heat is much more rapidly radiated or conducted from the thermo-expansion vessel G than in the construction heretofore employed wherein the casing of the trap is closed except for the opening C beneath, so that no circulation of air could take place therein.

My invention although it makes apparently but little change in the construction of the trap, nevertheless results in a very important difference in the operation thereof, since repeated tests show that under like circumstance as to external temperature, degree of steam pressure, rapidity of condensation, &c., my improved construction of trap will open in from one-fourth to one-fifth the time which is required to operate the former construction. It results from this that a much less mass of condensed water can accumulate within the pipes or radiators of the steam heating system, and consequently that the heating apparatus is rendered much more active and efficient, to such extent in fact that the amount of heating surface can be considerably reduced for a given heat radiation under a given steam pressure.

The purpose of the strainer K is to prevent dust, cinders, &c., entering the casing and finding their way between the valve face of the vessel G and the valve seat. This is important whenever the trap is to be used in connection with the steam heating of railway cars, for which it is principally designed. The function of the shield L is to prevent the blowing out of hot water or steam through the opening J, which might otherwise occur when the trap opens, and which, particularly in case of a trap mounted beneath a railway car, would be liable to scald a workman who might be occupied beneath the car at the time, as often occurs. When the trap opens, any hot water or steam that may be forced upward and pass out through the opening J, will be intercepted by the shield L, and will escape sidewise through the openings $g\ g$, and downwardly through the space or opening $h$, whereby the force of the steam will be broken and the outflow will occur so dividedly and in such directions as to amount to a mere harmless drenching of the front side of the trap with water which will not be thrown to any distance beyond it. The construction of the shield L as a hollow plate with notches in its sides enables it to be utilized to hold the strainer K in place, the latter being bent over the top of the casing and fastened between the casing and the upper part or fastening lug of the shield, while its lower portion is confined between the notched edges of the shield and the front face of the trap.

In the modified construction shown in Figs. 6 and 7, the casing A is formed with the same air opening J' as already described, and in addition a similar opening J' is formed through the cover D. In addition two other openings are formed through both the front of the casing and the cover, so that on each side there are three openings, as shown in Fig. 6. These are covered by strainers K' K'. Shields L' L' are applied on both front and back, being fastened by screws $f' f'$. The shields are made wider than in the construction first described, extending in the arc of a circle so as to cover the three holes, being formed with notches $g'$, in the flanges constituting their lower sides to provide for the escape of the air and of hot water or steam. This construction permits of a freer circulation of air than that first described, since the air has approximately six times the area of opening at the top through which to escape.

In Fig. 8 I have shown another construction wherein the air outlet opening, here lettered $J^2$, is formed through the roof of the casing, being covered by a strainer $K^2$, and a shield $L^2$, the latter being formed as a concave plate having notches $g^2$ in its edges, and fastened by one or more screws $f^2$.

While it is preferable that the air openings shall be so placed as to encourage an upward circulation of air, yet this is not essential to my invention, since for use on railway cars air openings placed horizontally opposite each other will be nearly as effective, because during the time that the car is in motion an air current will be induced laterally through the casing, provided only that the openings are arranged in the direction that the air current caused by the movement of the car tends to take. With openings so placed there will be less advantage to be gained by reason of the air circulation when the car is standing still, whereas when the openings are placed to establish an upward circulation of air, the effect is nearly as great when the car is standing still as when it is in motion. Often in applying a trap of the construction thus described to a car, it is impracticable to so apply it that it will stand erect, as shown in Figs. 1 to 8, the arrangement of the piping often requiring the trap to be turned down horizontally as shown in Fig. 9. When thus arranged the motion of the train will cause a circulation of air through the trap casing in substantially the manner already described. To facilitate this, the outlet opening C should be directed toward one end of the car.

I have shown in Fig. 9 a construction of shield lettered $L^3$ which is preferable for a trap thus arranged. The shield is prolonged beyond the top of the casing, which in this position becomes its left-hand end, and turned downwardly to form both an air passage and a spout for discharging downwardly any water or steam that may issue through the opening J.

I claim as my invention the following-defined novel features or improvements, substantially as hereinbefore specified, namely:

1. A steam trap comprising an inclosing casing having inlet and outlet openings for the condensed water, and a thermo-expansion vessel inclosed in said casing, containing a volatile liquid, the said casing constructed with opposite openings at top and bottom for admitting of an upward circulation of air through it around said vessel, so that the air heated by radiation within said casing may escape upwardly and its place be taken by cold air to hasten the cooling of said vessel and thereby accelerate the opening of the trap.

2. A steam trap comprising an inclosing casing having inlet and outlet openings for the condensed water, and a thermo-expansion vessel inclosed in said casing, containing a volatile liquid, the said casing constructed with opposite openings for promoting a circulation of air through it around said vessel to hasten the cooling thereof, combined with a shield over such air opening adapted to intercept any hot water or steam that may issue therefrom, and direct it downward or laterally and break its force, that it may do no damage.

3. A steam trap comprising a casing A, having inlet B, outlet C, and air-opening J, and a thermo-expansion vessel G inclosed in said casing, combined with a shield L over said air-opening, having lateral and bottom openings.

4. A steam trap comprising a casing A, having inlet B, outlet C, and air-opening J, and a thermo-expansion vessel G inclosed in said casing, combined with a strainer K over said air-opening, and a shield L fastened to the casing over the strainer to hold the latter in place, and having lateral notches $g$ $g$ to form openings for escape of air or hot water.

In witness whereof I have hereunto signed my name in the presence of two subscribing witnesses.

EDWARD E. GOLD.

Witnesses:
GEORGE H. FRASER,
FRED WHITE.